US011407108B2

(12) United States Patent
Inomata

(10) Patent No.: US 11,407,108 B2
(45) Date of Patent: Aug. 9, 2022

(54) HORIZONTAL ARTICULATED ROBOT AND RETURN-TO-ORIGIN METHOD THEREOF

(71) Applicant: NIDEC SANKYO CORPORATION, Nagano (JP)

(72) Inventor: Tetsuya Inomata, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 944 days.

(21) Appl. No.: 16/185,400

(22) Filed: Nov. 9, 2018

(65) Prior Publication Data
US 2019/0134814 A1 May 9, 2019

(30) Foreign Application Priority Data
Nov. 9, 2017 (JP) .............................. JP2017-216581

(51) Int. Cl.
| | | |
|---|---|---|
| G06F 19/00 | (2018.01) |
| B25J 9/16 | (2006.01) |
| B25J 18/00 | (2006.01) |
| B25J 17/02 | (2006.01) |
| G05B 19/00 | (2006.01) |
| B25J 9/04 | (2006.01) |

(52) U.S. Cl.
CPC ............. *B25J 9/1664* (2013.01); *B25J 9/042* (2013.01); *B25J 17/025* (2013.01); *B25J 18/00* (2013.01); *G05B 19/00* (2013.01); *G05B 2219/40224* (2013.01); *G05B 2219/50102* (2013.01); *G05B 2219/50111* (2013.01)

(58) Field of Classification Search
CPC ........ B25J 9/1664; B25J 9/042; B25J 17/025; B25J 18/00; G05B 19/00; G05B 2219/40224; G05B 2219/50102; G05B 2219/50111
See application file for complete search history.

(56) References Cited

U.S. PATENT DOCUMENTS

| | | | |
|---|---|---|---|
| 2010/0150688 A1* | 6/2010 | Kitahara | ........... H01L 21/68707 414/226.02 |
| 2010/0209225 A1* | 8/2010 | Matsuo | ............. H01L 21/67745 414/744.5 |
| 2011/0213497 A1* | 9/2011 | Nair | ........................ B25J 9/1666 700/255 |

FOREIGN PATENT DOCUMENTS

| | | |
|---|---|---|
| JP | H04167102 A | 6/1992 |
| JP | 5199117 B2 | 5/2013 |
| JP | 2014034107 A | 2/2014 |

(Continued)

*Primary Examiner* — Abby Y Lin
*Assistant Examiner* — Sohana Tanju Khayer
(74) *Attorney, Agent, or Firm* — Cantor Colburn LLP

(57) ABSTRACT

A robot may include a base; a base link connected to the base; an arm link coupled to the base link; an arm connected to the arm link; a hand connected to the arm; a storage; and a controller. The base link and arm link move so that a center of a coupling shaft of the arm link and the arm moves in a line. When the robot is within a predetermined range of a latest coordinate, the robot moves to the return-to-origin position in a direction from the transfer direction, otherwise the controller calculates the transfer path based on past teaching, and determines if there is a path close to the latest coordinate. If there is path, the controller determines whether the hand section is outside of a safe area, and if so, pulls the hand to a safe area and then moves the robot to the return-to-origin position.

13 Claims, 7 Drawing Sheets

(56) References Cited

FOREIGN PATENT DOCUMENTS

JP 2016120851 A 7/2016

* cited by examiner

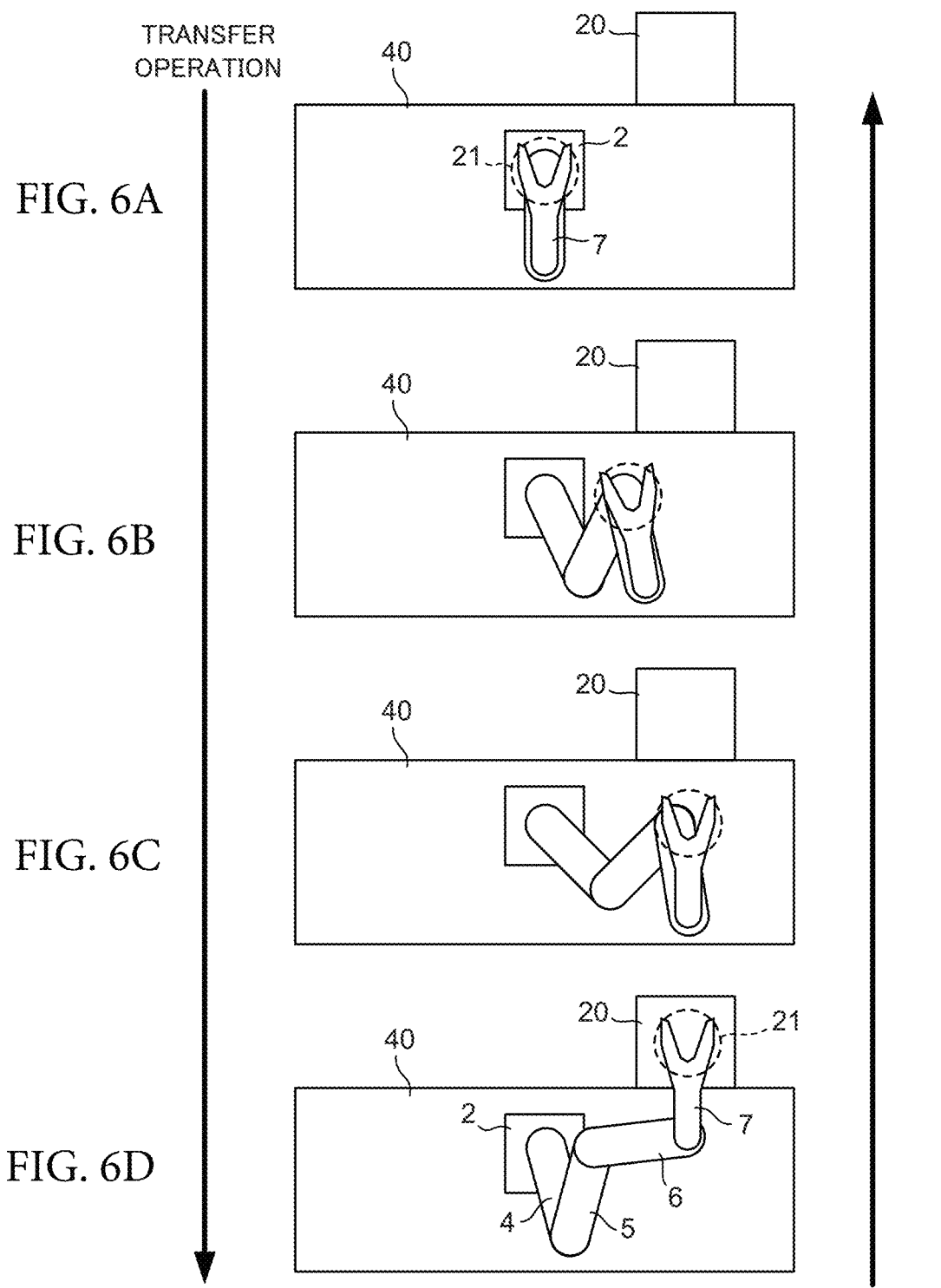

HORIZONTAL ARTICULATED ROBOT AND RETURN-TO-ORIGIN METHOD THEREOF

CROSS REFERENCE TO RELATED APPLICATION

The present application claims priority under 35 U.S.C. § 119 to Japanese Application No. 2017-216581 filed Nov. 9, 2017, the entire content of which is incorporated herein by reference.

TECHNICAL FIELD

At least an embodiment of the present invention relates to a horizontal articulated robot used for work transfer or the like and a return-to-origin method thereof.

BACKGROUND

For example, in a semiconductor manufacturing process, it is necessary to transfer a work, such as semiconductor wafer, between a cassette that houses the work and a work processing apparatus that performs a predetermined process on the work. In this case, it is necessary to load/unload a work to a plurality of cassettes. Therefore, an articulated robot configured to mutually and rotatably couple plurality of arms and to transmit rotational force of a motor or the like to the arms to extend and contract same has been used. A work transfer system is composed of a plurality of cassettes in which a work is housed, a work processing apparatus, and an articulated robot, in which the work is stored. Each cassette loads a work to be stacked as in a shelf, and with this, multiple works can be housed in one cassette. One example of such cassette is FOUP (Front-Opening Unified Pod), which is a transfer/storage box with a front opening type cassette stipulated in SEMI (Semiconductor Equipment and Materials International) standard E47.1. One example of a configuration of the work transfer system is disclosed in Patent Literature 1. In the work transfer system disclosed in Patent Literature 1, a plurality of cassettes are arranged in one row in a horizontal plane, a work processing apparatus is arranged at a position facing an arrangement of this plurality of cassettes, and a horizontal articulated robot is installed in an elongated space sandwiched by the arrangement of the cassettes and the work processing apparatus.

The articulated robot may have to perform return-to-origin operation for some reason during operation. Even in this return-to-origin operation, it is required that arms or hands of the robot do not collide with surrounding planes or equipment. Therefore, Patent Literature 2 discloses a feature wherein movement information for return-to-origin is preliminarily prepared for each movement position of a robot, and when the return-to-origin is requested, the robot is moved to an origin on the basis of the movement information for return-to-origin corresponding to the movement position where the robot has reached at that point in time, thereby performing return-to-origin. However, this method must prepare an extremely large amount of positional information for the return-to-origin when the robot has a high degree of freedom, and thus it is not practical to apply this method to a multiple-link articulated robot. Patent Literature 3 discloses a feature wherein with regard to trajectory information indicating a movement of an arm tip of the robot including a combination of a start point and an end point and positional information passing therebetween, related trajectory information in which the start point and the end point are interchanged is also included. The method described in Patent Literature 3 is based on the premise that the robot is present on a pre-set trajectory, and thus after the robot moves on the basis of the trajectory information, for example, after the robot moves to a position deviated from the trajectory by jog (JOG) operation, this method cannot achieve return-to-origin. Patent Literature 4 discloses a feature wherein with regard to a robot that is stopped in a state of losing a coordinate of a current position, an operator checks a current state of the robot and sets a temporary current position, and then moves the robot to a predetermined position to return the robot to an origin from the predetermined position. This method requires human intervention because the operator sets the temporary current position by observing the state of the robot.

[Patent Literature 1]
Japanese Patent Application No. 5199117
[Patent Literature 2]
Japanese Patent Application No. 4-167102
[Patent Literature 3]
Japanese Patent Application No. 2016-120851
[Patent Literature 4]
Japanese Patent Application No. 2014-34107

The multiple-link articulated robot described in Patent Literature 1 is articulated and has a degree of freedom of movement, and is widely used in a semiconductor manufacturing process that requires installation in a narrow working space. However, there is a risk of colliding with the surrounding walls or equipment during return-to-origin operation due to a high degree of freedom of movement unless the return-to-origin operation is performed with a correct operation path and a correct attitude. Especially in recent years, in a robot used in a semiconductor device manufacturing process, a movement range in which the robot can move arms or the like has become narrower with the miniaturization of an apparatus used for manufacturing, and it is desirable to be able to perform return-to-origin more safely and reliably. In addition, in the semiconductor device manufacturing process, it is difficult for the operator to get in close to the robot in order to modify the arm attitude, due to an environment and a structure of the device used. There is a situation where arbitrary jog operation cannot be performed since appearance of the robot cannot be observed, and thus it has been required that the robot is able to perform return-to-origin by its own ability without manual operation as much as possible.

SUMMARY

At least an embodiment of the present invention provides a horizontal articulated robot used for work transfer or the like, in which the return-to-origin can be safely performed without manual operation as much as possible and a return-to-origin method thereof.

The horizontal articulated robot of at least an embodiment of the present invention is a horizontal articulated robot used for transferring a work and comprises a base; a base side link rotatably connected to the base; an arm section side link coupled to the base side link; an arm section freely rotatably connected to the arm section side link; a hand section freely rotatably connected to the arm section to hold the work; a storage means configured to storing at least teaching data; and a control means configured to calculate a transfer path on the basis of the teaching data to control drive of the base side link, the arm section, and the hand section, and the base side link and the arm section side link constitute a link mechanism configured to control in such a manner that a movement locus of a center point of a coupling shaft of the arm section side link and the arm section becomes a predetermined straight line. In this horizontal articulated robot, the control means continuously executes recording of a coordinate of the horizontal articulated robot during transfer and return-to-origin operations; when a request for return-to-origin is input, the control means determines whether the coordinate of the horizontal articulated robot when the request is input is within a predetermined range from the latest recorded coordinate; when the coordinate is within the predetermined range, the control means calculates a locus of return-to-origin and moves the horizontal articulated robot to the return-to-origin position in a direction of returning from the transfer direction; when the coordinate is not within the predetermined range, the control means calculates the transfer path based on past teaching data stored in the storage means, and determines if there is any calculated transfer path close to the current coordinate, and if there is a transfer path close to the current coordinate, the control means moves the horizontal articulated robot to the transfer path, and then moves same to the return-to-origin position; and if there is no calculated transfer path close to the current coordinate, the control means determines whether the hand section is positioned outside of a turn safe area, and when the hand section is positioned outside, the control means pulls in the hand section to an inside of the turn safe area and then moves the horizontal articulated robot to the return-to-origin position through the specified via point.

The return-to-origin method of at least an embodiment of the present invention is a return-to-origin method of a horizontal articulated robot which comprises at least: a base; a base side link rotatably connected to the base; an arm section side link coupled to the base side link; an arm section freely rotatably connected to the arm section side link; a hand section freely rotatably connected to the arm section to hold the work; a storage means for storing teaching data; and a control means configured to control drive of the base side link, the arm section, and the hand section on the basis of the teaching data, which is used for transferring the work, and in which the base side link and the arm section side link constituting a link mechanism configured to control in such a manner that a movement locus of a center point of a coupling shaft of the arm section side link and the arm section becomes a predetermined straight line. The method continuously executes recording of a coordinate of the horizontal articulated robot during transfer and return-to-origin operations; when a request for return-to-origin is input, the control means determines whether the coordinate of the horizontal articulated robot when the request is input is within a predetermined range from the latest recorded coordinate; when the coordinate is within the predetermined range, the control means calculates a locus of return-to-origin and moves the horizontal articulated robot to the return-to-origin position in a direction of returning from the transfer direction; when the coordinate is not within the predetermined range, the control means calculates the transfer path based on past teaching data stored in the storage means, determines if there is any calculated transfer path close to the current coordinate, and if there is a transfer path close to the current coordinate, the control means moves the horizontal articulated robot to the transfer path, and then moves the horizontal articulated robot to the return-to-origin position; and if there is no calculated transfer path close to the current coordinate, the control means determines whether the hand section is positioned outside of a turn safe area, and when the hand section is positioned outside, the control means pulls in the hand section to an inside of the turn safe area and then moves the horizontal articulated robot to the return-to-origin position through the specified via point.

In such present invention, when it can be determined that an attitude of a robot when an instruction of return-to-origin is input has not changed since transfer stopped, the robot moves straight back on a transfer path to perform the return-to-origin. In addition, when the attitude of the robot has changed since the transfer stopped but any transfer path calculated from past teaching data is found to be close to a current attitude of the robot, the robot moves to the found transfer path and then moves back on the transfer path. Consequently, return-to-origin can be performed in these two cases. Meanwhile, when the current attitude (especially a tip of a hand section) is outside of a turn safe area, the hand section is pulled back to be inside of the turn safe area, and then returned to the origin through a specified via point. In this case, a configuration that goes through the specified via point is used, and thus it is only necessary to consider interference between the attitude being pulled back and the specified via point, and interference between the specified via point and the return-to-origin position, and safety confirmation becomes easy.

In at least an embodiment of the present invention, with a center of rotation of the base side link with respect to the base as an origin, the specified via point is specified for each quadrant of an XY orthogonal coordinate system in which one of two opposite directions parallel to the predetermined straight line is an X-axis positive direction. With this configuration, safe return-to-origin can be achieved regardless of the position or attitude of the robot.

In at least an embodiment of the present invention, the specified via point is set for each quadrant so as to fulfill two conditions, for example:
  (1) no interference occurs in the horizontal articulated robot when moving by PTP (Point to Point; point to point) operation between the specified via point and a return-to-origin position; and
  (2) no interference occurs in the horizontal articulated robot when moving by PTP operation between a standby/retracted position for any stage that is a target of load/unload of a work within the quadrant and the specified via point of the quadrant.

In this regard, however, depending on the structure, layout, and circumstances of each component of the work transfer system, a certain degree of effect can be expected even if only one condition is fulfilled. The stage is a target of load/unload of a work and is a generic name, including a cassette, a work processing apparatus, or the like. In other words, the stage is a device that is a source or a destination of the work. When condition (1) is fulfilled, safe PTP operation with a minimum number of via points and no interference is guaranteed between the specified via point and the return-to-origin position. This makes safety confirmation easier in return-to-origin operation. When condition (2) is fulfilled, an attitude when the hand section is pulled back inside of the turn safe area can be regarded as the standby/retracted position for a virtual stage, and safe PTP operation with a minimum number of via points and no interference is guaranteed between this attitude and the specified via point. This makes safety confirmation easy in return-to-origin operation. Furthermore, the specified via point may fulfill condition:
  (3) no interference occurs in the horizontal articulated robot when moving by PTP operation between specified via points of different quadrants.

When condition (3) is fulfilled, between the specified via points, safe PTP operation with a minimum number of via points and no interference is guaranteed, and safety confirmation work in normal transfer operation can be greatly omitted.

In at least an embodiment of the present invention, the specified via point is prestored in the horizontal articulated robot, for example, at the time of shipment, as being unique to the horizontal articulated robot. With this configuration, it is not necessary to set the specified via point individually, and a process for return-to-origin can be simplified accordingly.

According to at least an embodiment of the present invention, in a horizontal articulated robot used for work transfer or the like, return-to-origin can be safely performed without manual operation as much as possible.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6A-FIG. 6D are diagrams illustrating a movement of an articulated robot in case A;

DETAILED DESCRIPTION

Figure 1:
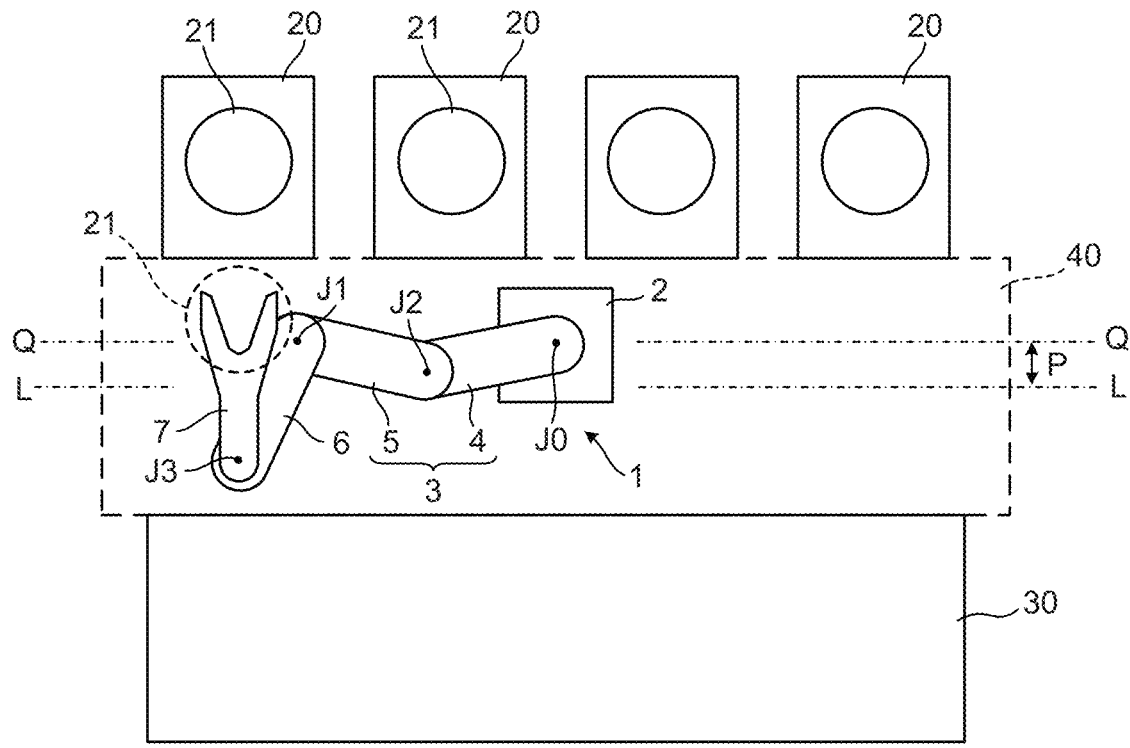
FIG. 1 is a plan view illustrating an articulated robot according to one embodiment of the present invention.

Next, an embodiment of the present invention will be described with reference to the drawings. FIG. 1 shows an articulated robot 1 according to one embodiment of the present invention. This articulated robot 1 constitutes a work transfer system together with a plurality of cassettes 20 each of which houses a work 21 and a work processing apparatus 30 which executes a process on the work 21. The plurality of cassettes 20 are arranged side by side in one direction, and the work processing apparatus 30 is arranged so as to face an arrangement of the cassettes 20. FIG. 1 shows four cassettes 20. An elongated rectangular area between the arrangement of the plurality of the cassettes 20 and the work processing apparatus 30 is a working area 40 in which the articulated robot 1 can move hands, arms and the like. The articulated robot 1 is installed in the working area 40 and can transfer the work 21 between the cassettes 20 and between the cassettes 20 and the work processing apparatus 30 by moving the links, arms, and hands. In the example shown here, a 3-linked horizontal articulated robot described in Patent Document 1 is used as the articulated robot 1. The articulated robot 1 transfers the work 21 between the cassettes 20 and between the cassettes 20 and the work processing apparatus 30. It is necessary to carry in/out the work 21 to/from the cassettes 20 and the work processing apparatus 30, that is, it is necessary to load/unload in accordance with transfer. In this case, a front opening type such as FOUP is used as the cassettes 20, and therefore a direction in which the articulated robot 1 loads/unloads the work 21 becomes a direction orthogonal to an arrangement direction of the cassettes 20.

The articulated robot 1 includes a hand section 7 which holds the work 21, an arm section 6 which rotatably holds the hand section 7, a link mechanism 3 which rotatably holds an arm joint section J1 at a proximal end side of the arm section 6 and which operates in such a manner that a movement locus of the arm joint section J1 becomes a straight line almost parallel to the arrangement direction of the cassettes 20, and a base 2, in which a proximal end side of the link mechanism 3 is rotatably supported. The link mechanism 3 includes a base side link 4 which is positioned on a base 2 side and is rotatably held on the base 2 and an arm section side link 5 which is positioned on an arm section 6 side, and both links 4 and 5 are rotatably coupled to each other by a link joint section J2.

Figure 2:
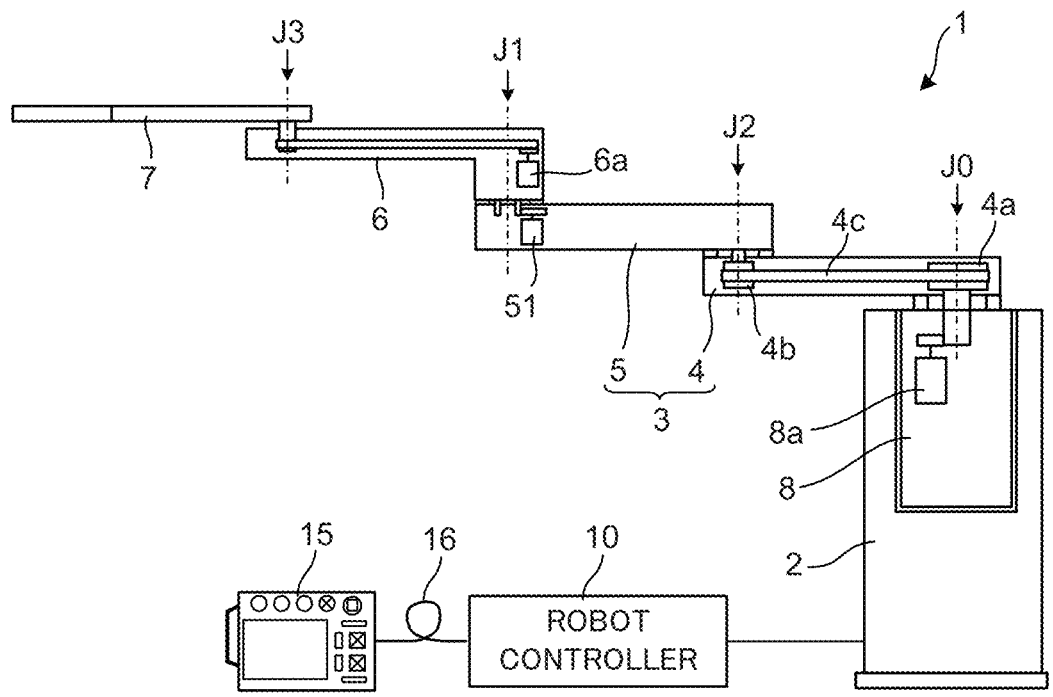
FIG. 2 is a diagram illustrating a mechanism of a horizontal articulated robot.

FIG. 2 is a more detailed illustration of the articulated robot 1, with a vertical cross-sectional view of the base 2, the link mechanism 3, the arm section 6, and the hand section 7. The base 2 includes a lift cylinder 8 that is driven by a lift motor (not shown) and lifted in an up-and-down direction. The base side link 4 is coupled to the lift cylinder 8, is rotatably held by a link mechanism motor 8a embedded in the lift cylinder 8, and can be lifted up and down with respect to the base 2 as the lift cylinder 8 is lifted up and down. A base side pulley 4a, an arm section side pulley 4b and a belt 4c are embedded in the base side link 4, and the belt 4c is bridged between the base side pulley 4a and the arm section side pulley 4b. A ratio of diameters of the base side pulley 4a and the arm section side pulley 4b is 2:1. The arm section side pulley 4b is coupled to the arm section side link 5 and a rotation angle ratio between the base side pulley 4a and the arm section side pulley 4b when the base side link 4 rotates about the center of rotation of the base side pulley 4a, i.e., the rotation angle ratio between the base side link 4 and the arm section side link 5 becomes 1:2. Furthermore, lengths of the base side link 4 and the arm section side link 5 are equal. As a result, in the link mechanism 3, a movement locus of a center point (arm joint section J1) of the coupling shaft which rotatably couples the arm section side link 5 and the arm section 6 is regulated on a predetermined straight line. In the figure, this predetermined straight line is indicated by a straight line Q. The arm section 6 is coupled to a tip of the arm section side link 5 and is rotatably held by an arm section motor 51 embedded in the arm section side link 5. In FIG. 2, for convenience of explanation, the arm section motor 51 is embedded in the arm section side link 5, but an installation position of the arm section motor 51 is not limited to this, and for example, the arm section motor 51 may be embedded in the arm section 6. The hand section 7 is coupled to a tip of the arm section 6 and is rotatably held by a frame motor 6a embedded in the arm section 6. A coupling center of the hand section 7 with respect to the arm section 6, i.e., the center of rotation of the hand section 7 is J3.

Figure 3:
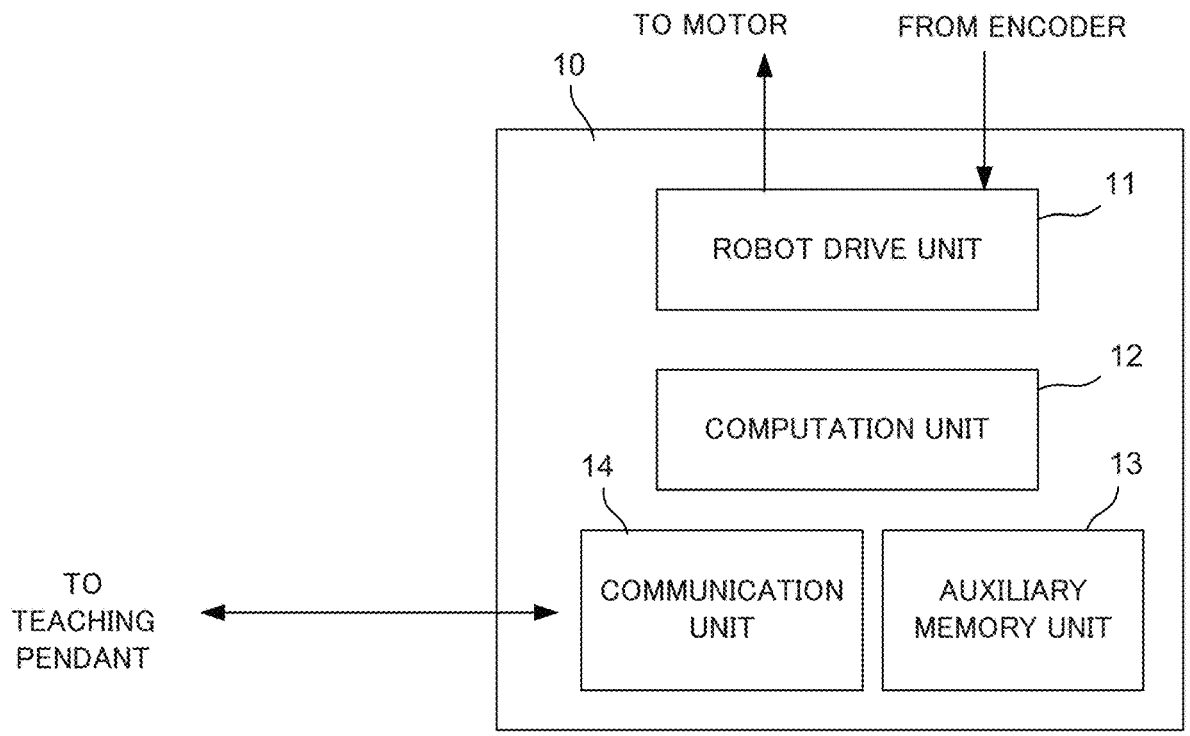
FIG. 3 is a block diagram showing a configuration of a robot controller.

The articulated robot 1 is equipped with a robot controller 10 for driving the articulated robot 1 and controlling its operation. A teaching pendant 15 is connected to the robot controller 10 via a cable 16. The teaching pendant 15 is used by an operator in teaching the articulated robot 1, and for example, a jog operation command is input. A return-to-origin command is also given to the articulated robot 1 via the teaching pendant 15. FIG. 3 shows a configuration of the robot controller 10. The robot controller 10 includes a robot drive unit 11 which is a servo-control circuit for motors such as the arm section motor 51, the frame motor 6a, and the link mechanism motor 8a in the articulated robot 1, a computation unit 12 which generates a servo command on the basis of a command input to the articulated robot 1 and outputs the servo command to the robot drive unit 11 and performs a necessary computation or the like, an auxiliary memory unit 13 which stores data necessary for a process in the computation unit 12, and a communication unit 14 which is a communication interface with the teaching pendant 15. In particular, the computation unit 12 corresponds to a control means and calculates a transfer path on the basis of teaching data, and controls driving of the motors such as the arm section motor 51, the frame motor 6a, and the link mechanism motor 8a on the basis of the transfer path. In order to perform servo-control, the robot drive unit 11 is connected to each motor in the articulated robot 1 and position information is input from an encoder attached to each motor. Consequently, the computation unit 12 can recognize a coordinate of each part of the articulated robot 1 on the basis of the position information input from the encoder, and has a function to store the recognized coordinate in the auxiliary memory unit 13. Furthermore, the computation unit 12 has a function to store the teaching data in the auxiliary memory unit 13 each time teaching is performed for this articulated robot 1.

In this embodiment, the position of the base 2 of the link mechanism 3 of the articulated robot 1, i.e., the center of rotation J0 of the base side link 4 rotatably held in the base 2 and the arm joint section J1 which is the center of rotation position in the link mechanism 3 are positioned biased to a side of the arrangement of the cassettes 20 for a length P from an intermediate position between the apparatus 30 and the four cassettes 20. The intermediate position between the work processing apparatus 30 and the four cassettes 20 is also considered to be a center line L in a longitudinal direction of a working area 40. In addition, the link joint section J2 is configured so as to be bent and protruded on a side opposite to this biased position as the link mechanism 3 is driven. Consequently, even if a length of each section of the arm section 6 and the link mechanism 3 is increased when a number of cassettes 20 arranged along one long side of the working area 40 is increased, it is possible to prevent the link joint section J2 of the link mechanism 3 from contacting with the apparatus 30 or the cassettes 20. As a result, it is possible to prevent the work transfer system from being enlarged as a whole, and thus to save space. Here, while the center of rotation J0 of the base side link 4 and the arm joint section J1 are positioned biased closer to the arrangement of the cassettes 20 than the intermediate position (the center line L of the working area 40), on the contrary, the center of rotation J0 and the arm joint section J1 may be positioned biased closer to a side of the work processing apparatus 30. In this case, the movement locus of the arm joint section J1 is positioned biased closer to the side of work processing apparatus 30, and the link joint section J2 is bent and protruded more in the side of the cassettes 20 than the intermediate position.

The operation when the articulated robot 1 loads/unloads the work 21 to, for example, the cassettes 20 or the work processing apparatus 30 is basically the same as that described in Patent Literature 1. In the following description, the cassettes 20 and the work processing apparatus 30, which are targets of load/unload of the work 21, are called stages. When loading the work 21 into the stage, the work 21 is transferred to a position in front of the stage in the working area 40 (standby/retracted position) in a state of being placed on the hand section 7. In a state where the work has been transferred to the standby/retracted position, the hand section 7 extends parallel to a direction in which the work 21 is loaded into the stage. Then, the hand section 7 moves in a loading direction to load the work 21. After that, the hand section 7 is moved to be in a direction opposite to the loading direction. A process for unloading the work 21 from the stage is performed in the same way as when the load is performed.

In the above description, while the work processing apparatus 30 has been arranged at a position opposite to the arrangement of the plurality of cassettes 20, the position of the work processing apparatus 30 is not limited to this, and may be arranged at any place surrounding the working area 40. For example, the work processing apparatus 30 can be arranged on a straight line for which the movement locus of the arm joint section J1 is extended. In addition, while it has been described that the plurality of cassettes 20 are arranged side by side, as long as the standby/retracted position is defined in the load/unload, it is possible to arrange, for example, a machining device for machining the work 21 in addition to the cassettes 20. These machining devices also correspond to the stage.

Next, the return-to-origin operation in the articulated robot 1 will be described. In the following description, an XY orthogonal coordinate system in which a center of rotation J0 of a base side link 4 of the articulated robot 1 is an origin and a direction parallel to a long side of the working area 40 is an X-axis positive direction is considered. In this case, either of two directions from the origin to both ends of the X-axis may be the X-axis positive direction. Based on that the center of rotation J0 and a movement locus of the arm joint section J1 are arranged biased closer to the arrangement of the cassettes 20 than the center line L in the longitudinal direction of the working area 40, a direction from the center of rotation J0 to the arrangement of the cassettes 20 can be defined as a Y-axis positive direction. When the center of rotation J0 and the movement locus of the arm joint section J1 are biased in a direction farther away from the arrangement of the cassettes 20 than the center line L in the longitudinal direction of the working area 40, the direction farther away from the cassettes 20 may be defined as the Y-axis positive direction. Then, a state where the articulated robot 1 is in the return-to-origin position means that the base side link 4, the arm section side link 5, the arm section 6 and the hand section 7 overlap with one another, and the articulated robot 1 has an attitude such that this overlap is aligned so as to be oriented in a −Y direction from the center of rotation J0 of the base side link 4 (see sign 60 in FIG. 8). Thus, the return-to-origin position is a representation including the attitude of the articulated robot 1, not just a position. In addition, the return-to-origin operation moves a robot which is at any position or is taking any attitude to the return-to-origin position. Moving the articulated robot 1 to the return-to-origin position is also simply referred to as "moving to an origin". In this embodiment, the articulated robot 1 is controlled in such a manner that the movement locus of the arm joint section J1 is parallel to the longitudinal direction of the working area 40, and thus the base side link 4 and the arm section side link 5 do not interfere with the surrounding equipment or walls. Consequently, in the return-to-origin operation, it is necessary that the arm section 6 and the hand section 7 do not collide with surrounding equipment or walls.

A request for the return-to-origin is input by operation of an operator for the teaching pendant 15, for example. A robot state when the return-to-origin is requested could be following three:

(1) a case where the articulated robot 1 is either stopped naturally or stopped in an emergency and keeps its position and attitude at the stop during normal work transfer operation;
(2) a case where manual operation is performed with the servo-control of the articulated robot 1 turned off, or the servo-control is on, but the jog operation is performed, and as a result, a transfer path deviates from an original transfer path and the attitude has also changed from an original attitude, but a current attitude is close to an attitude in a transfer path by past teaching; and
(3) a case where manual operation is performed with the servo-control of the articulated robot 1 turned off, or the servo-control is on, but the jog operation is performed, and as a result, a transfer path deviates from an original transfer path and the attitude has also changed from an original attitude, and current position and attitude are not close to any position and attitude in the transfer path by past teaching.

Figure 4:
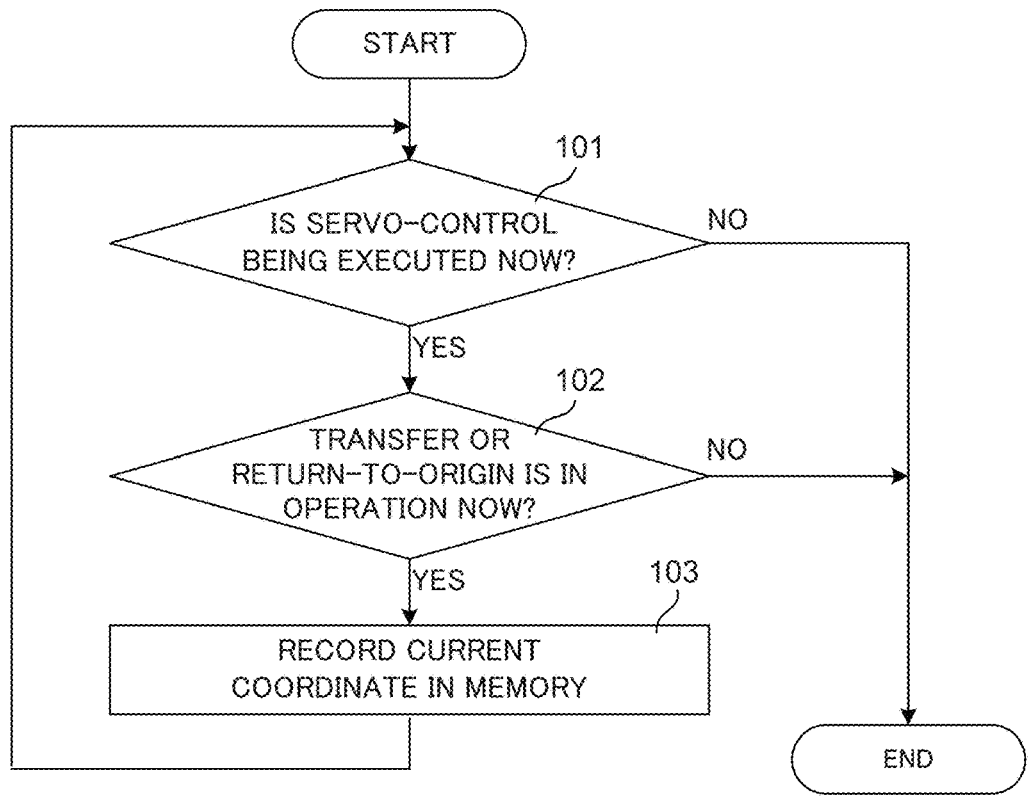
FIG. 4 is a flowchart illustrating a return-to-origin method according to one embodiment of the present invention.

In the return-to-origin method in this embodiment, a process corresponding to each of the cases (1)-(3) is performed. Thus, the return-to-origin instruction is not rejected by an error, and the return-to-origin is safely performed without colliding with or interfering with surrounding equipment or walls in many more scenes. To do so, first, it is necessary to be able to determine whether the robot state is any of (1)-(3) when a request for return-to-origin is input. To this end, during normal transfer or normal return-to-origin operation, the articulated robot 1 always keeps recording a coordinate of a position of each section of itself in the auxiliary memory unit 13 in the robot controller 10. FIG. 4 shows a process that the computation unit 12 performs at all times during the operation of the articulated robot 1 in order to record the coordinate. First, in step 101, whether each motor is driven by servo-control is determined. If the servo-control is not being executed, the process is terminated, and if the servo-control is being executed, then in step 102, whether the articulated robot 1 is currently in normal transfer operation or in return-to-origin operation is determined. If the articulated robot 1 is in neither the normal transfer operation nor the return-to-origin operation, the process is terminated, and if in the normal transfer operation or the return-to-origin operation, a current coordinate is recorded in a memory (the auxiliary memory unit 13) in step 103, and the process returns to step 101. Thus, if the servo-control is running and the normal transfer operation or the return-to-origin operation is performed, the coordinate of the position of the articulated robot 1 is momently written in the auxiliary memory unit 13.

Figure 5:
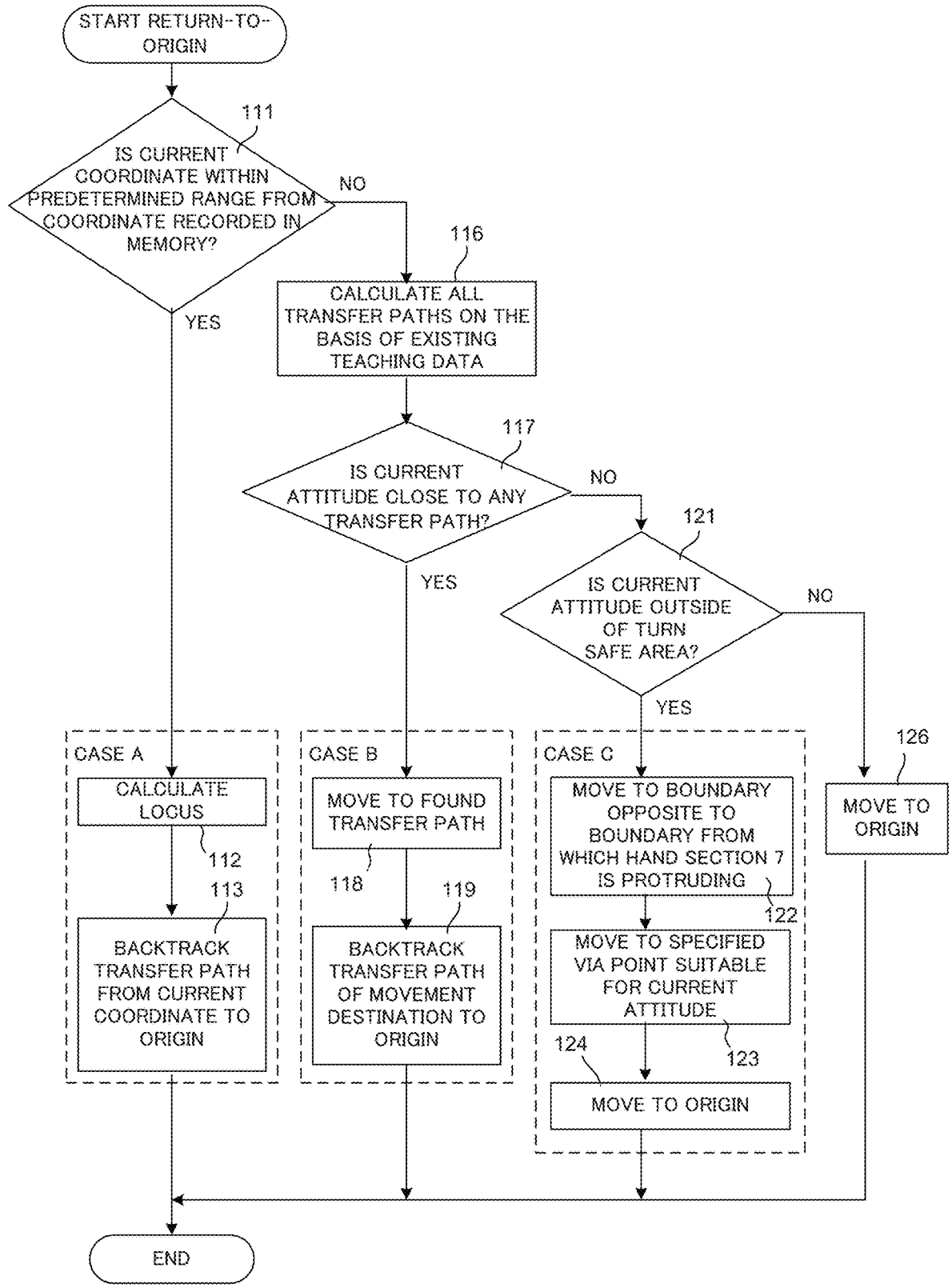
FIG. 5 is a flowchart illustrating a return-to-origin method according to one embodiment of the present invention.

FIG. 5 shows a process of the computation unit 12 when the return-to-origin command is input from the teaching pendant 15 or the like. When the return-to-origin operation is started upon receipt of a return-to-origin command input, the computation unit 12 first determines, at step 111, whether a current coordinate of the articulated robot 1, which is represented by a position information input by the encoder or the like at that time, almost coincides with a latest recorded coordinate in a memory (the auxiliary memory unit 13), specifically, whether the current coordinate is within a predetermined range from a coordinate recorded in the memory. When the current coordinate is within the predetermined range, the robot state can be determined to be in the state of above (1), that is, a state where the robot is stopped during normal work transfer operation, and the robot keeps its position and attitude. Therefore, if moving back on a stopped transfer path on the basis of the teaching data about the transfer, the robot can return to the return-to-origin position, and thus in step 112, the robot moves back to calculate a path to the return-to-origin position, and in step 113, the articulated robot is driven in a returning direction from the transferring direction by the servo-control on the basis of the calculated path, and finally moved to the origin, and the process of the return-to-origin operation is terminated. A process corresponding to the state of (1), that is, a process that executes steps 112 and 113 is regarded as a "case A".

FIG. 6A-FIG. 6D are diagrams illustrating a change in the attitude of the articulated robot 1 in case A. Here, a case, where transfer stops during transfer operation of loading/unloading the work 21 to cassettes 20 provided in contact with the working area 40 from a state of being positioned at the return-to-origin position, is considered. FIG. 6A-FIG. 6D show in order a change in the attitude of the articulated robot 1 from when the work 21 is at the return-to-origin position until when the work 21 is loaded/unloaded to the cassettes 20, as indicated by a downward arrow in the figure. In case A, the transfer stops during the transfer operation, and then, the articulated robot 1 keeps the attitude at the stop. When return-to-origin is requested while keeping the attitude at the stop, the robot can return to the origin by tracking back a path in a previous transfer operation in a reverse direction in such a way indicated as the return-to-origin operation by an upward arrow in the figure.

In step 111, if the current coordinate of the articulated robot 1 is not within the predetermined range from the latest recorded coordinate in the memory, the robot state can be considered to be the state of above (2) or (3). In this case, in order to determine whether the state is (2) or (3), in step 116, the computation unit 12 calculates, on the basis of existing teaching data stored in the auxiliary memory unit 13, all transfer paths based on those teaching data. Then, in step 117, the computation unit 12 determines whether the current attitude of the articulated robot 1 is close to any calculated transfer path (i.e., a transfer path based on the existing teaching data). If a transfer path close to the current attitude is found, the state is (2), and if the robot can move to the found transfer path safely, then can perform return-to-origin by moving back on the found transfer path. Therefore, in step 117, the transfer path close to the current attitude is searched making an allowance for a margin such that collision is not caused by a difference between the current attitude and the transfer path. Then, in step 117, if a transfer path close to the current attitude is found, in step 118, the computation unit 12 moves the articulated robot 1 to the found transfer path, and then in step 119, the articulated robot 1 is driven in a reverse direction on a transfer path of movement destination (the transfer path found in step 117) by the servo-control, and finally moved to the origin, and the process of the return-to-origin operation is terminated. A process corresponding to the state (2), that is, a process that executes steps 118 and 119 is regarded as a "case B".

Figure 7A:
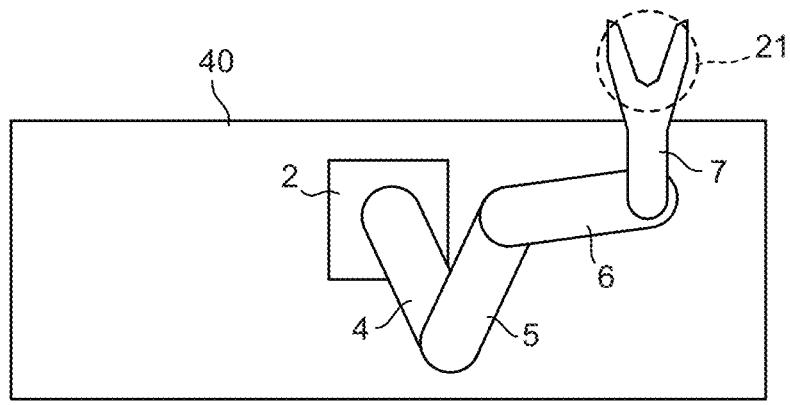
FIG. 7A-FIG. 7C are diagrams illustrating the movement of the articulated robot in case B.
Figure 7B:
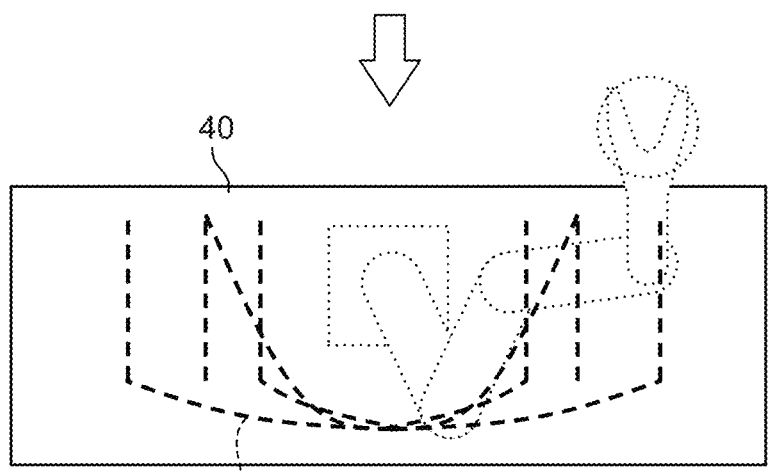
Figure 7C:
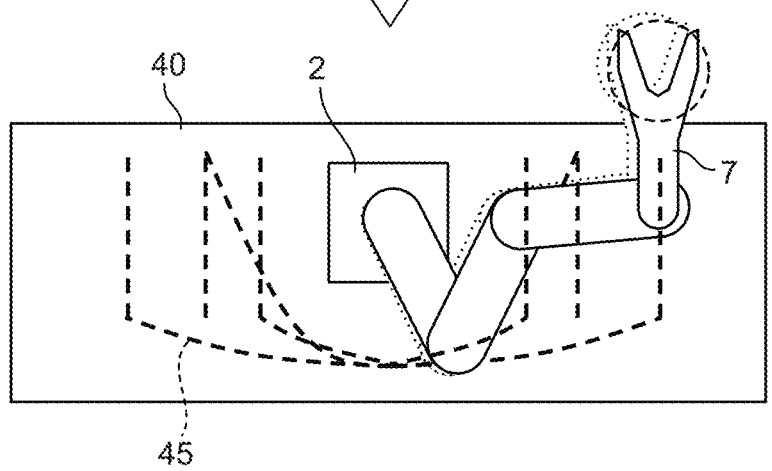

FIG. 7A-FIG. 7C are diagrams illustrating the return-to-origin operation in case B. FIG. 7A shows a state where transfer operation of the work 21 is stopped. Here, suppose that, as a result of performing jog operation after the stop, the attitude of the articulated robot 1 deviates from an original transfer path (a state of being "No" in step 111 in FIG. 5). The computation unit 12 calculates the transfer path on the basis of past teaching data stored in the auxiliary memory unit 13. In FIG. 7B, a bold dashed line shows the calculated transfer path 45. In case B, since a transfer path close to the current attitude of the articulated robot 1 is found in the calculated transfer path, the attitude of the articulated robot 1 is moved to the found transfer path as shown in FIG. 7C. After that, the articulated robot 1 can return to the origin by tracking back the found transfer path in a reverse direction.

In step 117, if there is no path close to the current attitude in the transfer paths based on the existing teaching data, the state is above (3). In this case, in step 121, the computation unit 12 determines whether the current attitude is outside of a turn safe area. The turn safe area is an area in which the hand section 7 can be turned independently with respect to the arm section 6 to overlap with the arm section 6 without causing collision. If a tip of the hand section 7 is in the working area 40, the hand section 7 can be rotated so as to overlap with the arm section 6 without causing collision within the working area 40, and thus is considered to be inside of the turn safe area. On the other hand, when the tip of the hand section 7 protrudes to the outside exceeding the boundary of the working area 40 as when loading/unloading the work 21 to the cassettes 20, if the hand section 7 is rotated in that state, the hand section 7 collides with an inner wall of the cassettes 20, and thus the attitude of the articulated robot 1 is considered to be outside of the turn safe area. Depending on a shape of a device to load/unload the work 21, there are rarely times when the attitude of the device is inside of the turn safe area even if being in outside of the working area 40. However, in general, the turn safe area may be regarded as same as the working area 40. Consequently, it is only necessary for the computation unit 12 to determine whether the tip of the hand section 7 is outside of the turn safe area, assuming that the working area 40 is the turn safe area. In addition, although there are cases where the working area 40 is not a rectangle, in such a case, it is only necessary to store a parameter indicating the boundary of the working area 40 in the auxiliary memory unit 13 and determine whether the tip of hand section 7 is outside of the turn safe area on the basis of the parameter.

When the current attitude is outside of the turn safe area, the hand section 7 cannot be rotated as it is, and thus in step 122, the hand section 7 is moved, in a direction opposite to a load/unload direction, toward a boundary within the turn safe area, that is opposite to a boundary from which the hand section 7 is protruding. Then in step 123, the articulated robot 1 is moved to a specified via point suitable for the current attitude after moving. Next, in step 124, the articulated robot 1 is moved to the return-to-origin position, and operation of return-to-origin process is terminated. The specified via point will be described later. The articulated robot 1 can be moved by a point-to-point (PTP) operation with a minimum number of via points from the specified via point to the return-to-origin position. A process that executes steps 122-124 is regarded as a "case C".

In step 121, if the current attitude is inside of the turn safe area, in step 126, for example, the hand section 7 is rotated so as to overlap with the arm section 6, and then the arm section 6 controls the articulated robot 1 so as to overlap with the link mechanism 3, thereby returning the articulated robot 1 to the origin, and the operation of the return-to-origin process is terminated. In this case, the robot may be configured so as to first move from the current attitude to a suitable specified via point therefor, and then to move to the return-to-origin position.

Next, the specified via point will be described. When the articulated robot 1 is used for transfer of the work 21 and load/unload of the work 21, the standby/retracted position when loading/unloading the work 21 to that stage is defined no matter what device, i.e., stage in/from which the work 21 is carried is. It is only necessary to determine a movement locus between the stage and the standby/retracted position of that stage and the movement locus of the articulated robot 1 between the standby/retracted positions of the stage. In order to shorten a transfer time, it is necessary to reduce the number of via points therebetween. In addition, in the articulated robot 1 in this embodiment, since the movement locus of the arm joint section J1 is regulated on a straight line, an elongated area with a direction parallel to the straight line as a longitudinal direction, for example, a rectangle area, is defined as the working area 40. The working area 40 does not necessarily have to be rectangular, and the working area 40 may have a shape such that a part of a rectangle is deformed. In particular, an end of the working area 40 in a longitudinal direction may be shaped like an arc, for example.

Figure 8:
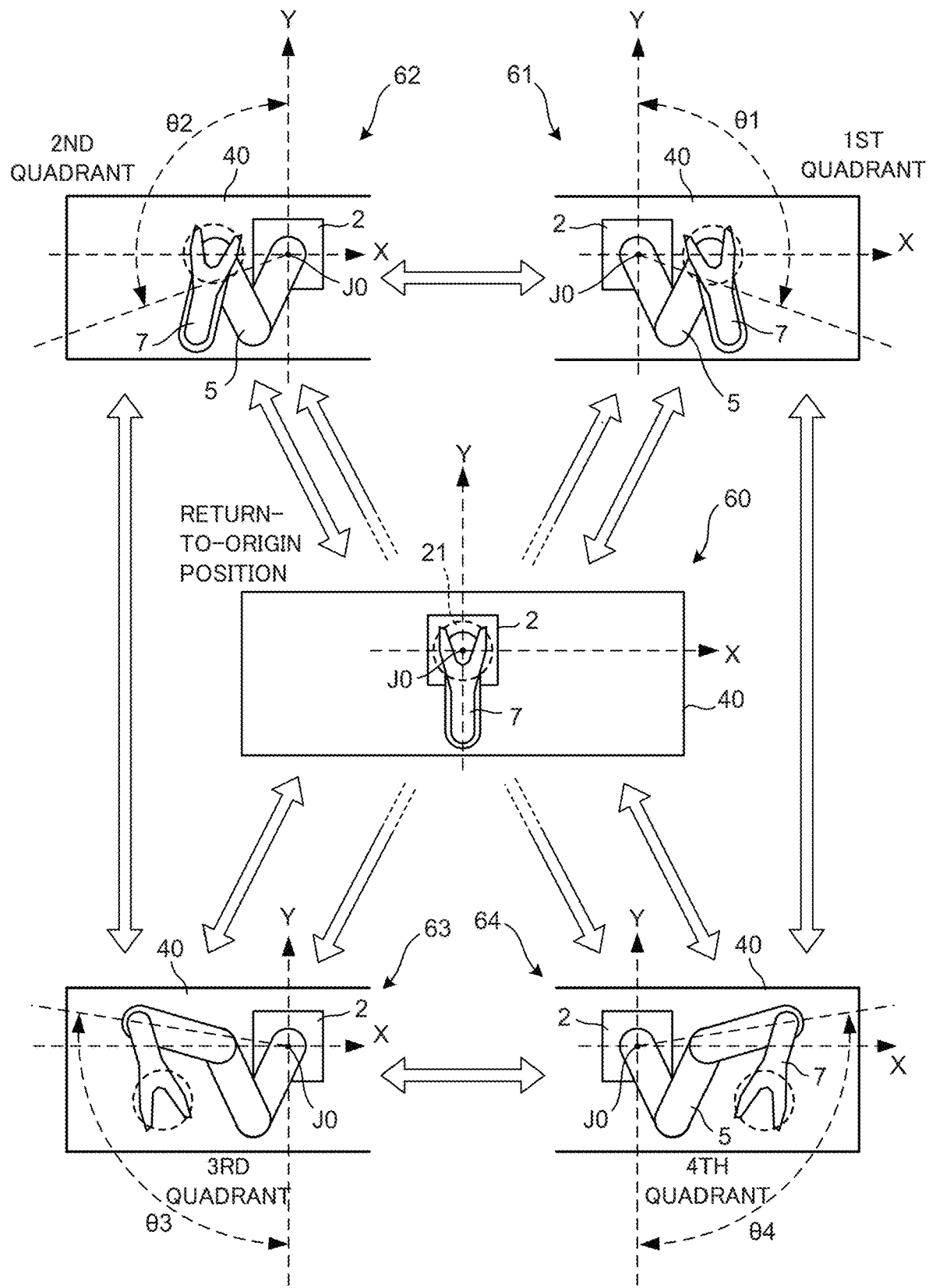
FIG. 8 is a plan view illustrating each specified via point and an attitude at the specified via point.

As described above, in an XY orthogonal coordinate system in which a center of rotation J0 of a base side link 4 of the articulated robot 1 is an origin and one of directions parallel to a long side of the working area 40 is an X-axis positive direction, attention is focused on each quadrant in this XY orthogonal coordinate system. Then, a specified via point for each quadrant and an attitude of the articulated robot 1 at the specified via point are set. FIG. 8 is view illustrating the specified via point. In FIG. 8, a sign 60 shows the return-to-origin position of the articulated robot 1. The specified via point is introduced for the purpose of reducing a number of via points as much as possible when performing teaching of the transfer path. This specified via point set for each quadrant is defined to fulfill at least one of conditions:

(1) the articulated robot 1 can carry out transfer between specified via points of different quadrants by PTP operation without interfering with the surroundings;

(2) the articulated robot 1 can also carry out transfer between the specified via point and the return-to-origin position by the PTP operation without interfering with the surroundings; and (3) the articulated robot 1 can also carry out transfer between the standby/retracted position of any stage in a corresponding quadrant and its specified via point by the PTP operation without interfering with the surroundings. FIG. 8 shows that the PTP operation can be performed between the specified via points, or between the specified via point and the return-to-origin position, by means of the white two-way arrows.

In a horizontal articulated robot as used in this embodiment, in which a tip of a link (here, the arm joint section J1) is controlled to be parallel to the predetermined straight line, and the arm section 6 and the hand section 7 are respectively and rotatably mounted at an end of the tip of the link in this order, there is always a specified via point for each quadrant, that fulfills the above conditions (1)-(3) simultaneously. The PTP operation is possible if any of the above conditions (1)-(3) is fulfilled, and thus in teaching a transfer path, the PTP operation is possible in a section corresponding to any of the conditions. Therefore, at least for that section, the number of via points can be minimized. In addition, since a coordinate system that specifies a quadrant is specified by the center of rotation J0 of the base side link 4 and the predetermined straight line described above, the specified via point can be specified in accordance with only lengths of the link mechanism 3, the arm section 6, and the hand section 7 of the articulated robot 1. This makes it possible to set the specified via point at a time of shipment of the articulated robot 1, which facilitates an adjustment work of the articulated robot 1 at an installation site. In the following description, the specified via point fulfills the above conditions (1)-(3) simultaneously.

The specified via points of each quadrant will be described in details below. A sign 61 illustrates the specified via point of a 1st quadrant, and the specified via point of this 1st quadrant targets at the standby/retracted position of a stage in an angle range θ1 shown in the figure. The angle range θ1 is a range which is from a position slightly rotated in a clockwise direction from the X-axis positive direction to the Y-axis positive direction when viewed from the center of rotation J0 of the base side link 4. In the attitude of the specified via point of the first quadrant, the hand section 7 is oriented in the Y-axis positive direction and is either parallel to the Y-axis or slightly inclined from the Y-axis in a counterclockwise direction. A sign 62 shows the specified via point of the 2nd quadrant. The specified via point of the 2nd quadrant targets at the standby/retracted position of a stage in an angle range θ2, and is basically symmetrical to the specified via point of the 1st quadrant with respect to the Y-axis. However, in a case of a device in which arrangement of a layout or a stage is not symmetrical or in a case where a center of the working area 40 along the X-axis does not coincide with the origin position, the specified via points of the 1st quadrant and the 2nd quadrant are not necessarily symmetrical with respect to the Y-axis, and the hand section 7 at those points may respectively take an own attitude.

A sign 63 shows the specified via point of the 3rd quadrant. The specified via point of the 3rd quadrant targets at the standby/retracted position of a stage in an angle range θ3. The angle range θ3 is a range which is from a position slightly rotated in a clockwise direction from the X-axis negative direction to the Y-axis negative direction when viewed from the center of rotation J0 of the base side link 4. At the specified via point of the 3rd quadrant, the opening angle between the base side link 4 and the arm section side link 5 is slightly larger than that of the 1st quadrant. In a case where the hand section is configured to be overlapped with the arm section 6, it is necessary to rotate the hand section 7 to open when moving to any stage. In this regard, an angle of the arm section 6 with respect to the X-axis is smaller than that in ca case of the first quadrant, and thus a time required for the rotation of the hand section 7 becomes long. Therefore, at the specified via point of the 3rd quadrant, the opening angle is formed between the arm section 6 and the hand section 7 with a center of rotation J3 of the hand section 7 being interposed. The hand section 7 is configured in such a manner that an angle between the arm section 6 and the hand section 7 is an acute angle and is inclined about, for example, 20° to 30° with respect to the Y-axis. A sign 64 shows the specified via point of the 4th quadrant. The specified via point of the 4th quadrant is targets at the standby/retracted position of a stage in an angle range θ4, and is basically symmetrical to the specified via point of the 3st quadrant with respect to the Y-axis. However, in a case of a device in which arrangement of a layout or a stage is not symmetrical or in a case where a center of the working area 40 along the X-axis does not coincide with the origin position, the specified via points of the 3rd quadrant and the 4th quadrant are not necessarily symmetrical with respect to the Y-axis, and the hand section 7 at those points may respectively take an own attitude.

Here, focusing on the angle range θ1 at which the specified via point of the 1st quadrant targets, and the angle range θ4 at which the specified via point of the 4th quadrant targets, they overlap with each other at a position that is an end of the longitudinal direction of the working area 40. In a case where a transfer path from a stage having the standby/retracted position or to such a stage is considered at this overlapping position, in accordance with, for example, what kind of transfer is scheduled before and after, a specified point at which there is no waste in motion of the articulated robot 1 among specified via points having an overlapping target range may be selected. In the articulated robot 1, the hand section 7 cannot rotate about the center of rotation J3 with respect to the arm section 6 unrestrictedly, and often can rotate only within a range of, for example, ±270° from a state of being overlapped with the arm section 6. Consequently, there are times where it is automatically determined that one of two specified via points should be specified depending on the limitation of this rotation angle. There is also a similar overlap of angle ranges between the angle range θ2 at which the specified via point of the 2nd quadrant targets and the angle range θ3 at which the specified via point of the 3rd quadrant targets. Also, in this case, a same process as when the angle ranges overlap between the 1st quadrant and the 4th quadrant may be performed.

While the specified via point has been described above, a state where the hand section 7 is moved in a direction opposite to the load/unload direction by the step 122 in the case C shown in FIG. 5 is considered. This state can be considered to be a state where the articulated robot 1 is hypothetically moved to the standby/retracted position for some stage. Consequently, for moving to a suitable specified via point for that attitude, i.e., the specified via point of a current quadrant to which the articulated robot 1 belongs from a state after executing step 122 (step 123), the PTP operation can be performed. Furthermore, the PTP operation can also be performed for moving from the specified via point to the origin at step 124.

Figure 9A:
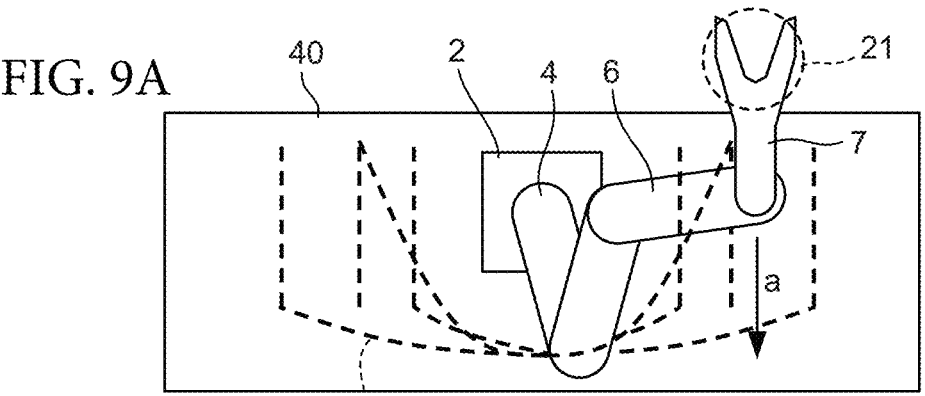
FIG. 9A-FIG. 9C are diagrams illustrating the movement of the articulated robot in case C.
Figure 9B:
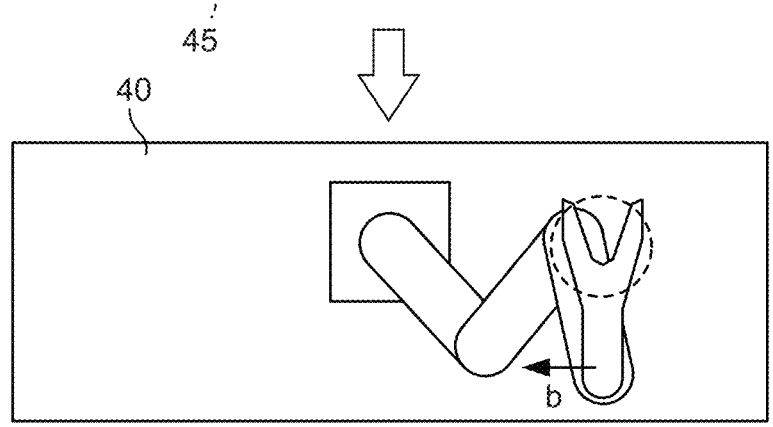
Figure 9C:
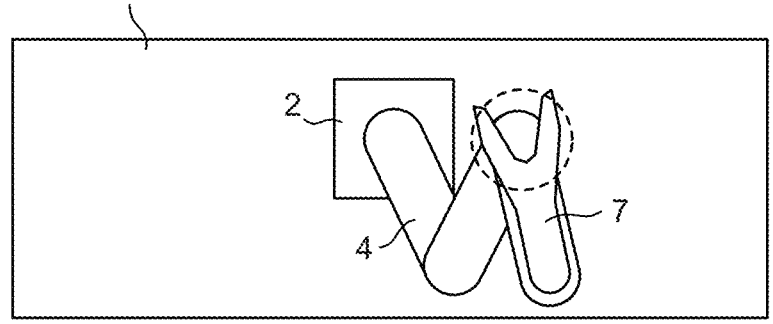

FIG. 9A-FIG. 9C show a change in the attitude of the articulated robot 1 in such case C. FIG. 9A shows a state where the transfer operation of the work 21 is stopped. Here, as a result of that the jog operation is performed after the stop, the attitude of the articulated robot 1 deviates from an original transfer path, further deviates even from any transfer path 45 calculated from the existing teaching data, and is outside of the safe area (a state of being "Yes" in step 121 in FIG. 5). Therefore, in step 122, the hand section 7 is moved, in a direction opposite to a load/unload direction, toward a boundary within the turn safe area, that is opposite to a boundary from which the hand section 7 is protruding. This move is indicated by an arrow a in FIG. 9A, and an attitude after moving is shown in FIG. 9B. After that, in step 123, the articulated robot 1 is moved to a specified via point suitable for the current attitude after moving, and the move of the articulated robot 1 in doing so is indicated by an arrow b in FIG. 9B. FIG. 9C shows the attitude of the articulated robot 1 after moving to the specified via point.

In the above, while the return-to-origin method of at least an embodiment of the present invention has been described as a horizontal articulated robot having three links, the method of at least an embodiment of the present invention can be applied to a horizontal articulated robot having a mechanism of four or more links. Also, in this case, a robot position is always recorded in a memory when the robot is servo driven for normal transfer or return-to-origin operation, and a current position when return-to-origin is requested and a latest position recorded in the memory are compared. Thus, it is possible to know a state of the robot when the return-to-origin is requested is whether a state on a normal transfer path or a state after being moved by jog operation or manual operation. There are cases where the horizontal articulated robot is provided with two hands for a leading-edge arm (the arm section 6 in the articulated robot 1 of this embodiment). Such robot is called a double-hand robot. The return-to-origin method based on at least an embodiment of the present invention can be applied to the double-hand robot. The above-mentioned step 122 is a process that moves the hand toward to a boundary opposite to a boundary from which the hand is protruding, thereby pulling back the hand inside of the turn safe area. In a case of the double-hand robot, it is necessary to consider a hand pulling back process in such a manner that both hands do not collide with opposite turn-safe area boundaries.

Effects of the Present Embodiment

As described above, in this embodiment, a three-link horizontal articulated robot can safely return to an origin from a state of extending an arm. In addition, by classifying attitudes of the robot when return-to-origin is instructed into cases and specifying a process for return-to-origin for each case, the return-to-origin can be automatically performed without manual operation. Furthermore, moving back on an already set transfer path or going through a specified via point enables returning to the origin without wasted move.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A horizontal articulated robot used for transferring a work, comprising:
    a base;
    a base side link rotatably connected to the base;
    an arm section side link coupled to the base side link;
    an arm section freely rotatably connected to the arm section side link;
    a hand section freely rotatably connected to the arm section to hold the work;
    a storage configured to store at least teaching data; and
    a computation unit which calculates a transfer path on a basis of the teaching data to control drive of the base side link, the arm section, and the hand section,
    wherein the base side link and the arm section side link constitute a link mechanism configured to control in such a manner that a movement locus of a center point of a coupling shaft of the arm section side link and the arm section becomes a predetermined straight line,
    wherein with a center of rotation of the base side link with respect to the base as an origin, a specified via point is specified for each quadrant of an XY orthogonal coordinate system in which one of two opposite directions parallel to the predetermined straight line is an X-axis positive direction,
    wherein the computation unit continuously executes recording of coordinates of the horizontal articulated robot during transfer operation and return-to-origin operation,
    wherein when a return-to-origin request is input, the computation unit determines whether or not a current coordinate of the horizontal articulated robot when the return-to-origin request is input is within a predetermined range from a latest recorded coordinate,
    wherein when the current coordinate is within the predetermined range, the computation unit calculates a locus for the return-to-origin operation and moves the horizontal articulated robot in a returning direction to a return-to-origin position,
    wherein when the current coordinate is not within the predetermined range, the computation unit calculates past transfer paths based on past teaching data stored in the storage, and determines whether or not there is any calculated transfer path close to the current coordinate among the past transfer paths, and if there is the calculated transfer path close to the current coordinate, the computation unit moves the horizontal articulated robot to the calculated transfer path, and then moves the horizontal articulated robot to the return-to-origin position, and
    wherein if there is no calculated transfer path close to the current coordinate among the past transfer paths, the computation unit determines whether or not the hand section is positioned outside of a turn safe area, and when the hand section is positioned outside of the turn safe area, the computation unit pulls in the hand section to an inside of the turn safe area and then moves the horizontal articulated robot to the return-to-origin position through the specified via point specified for each quadrant of the XY orthogonal coordinate system.

2. The horizontal articulated robot according to claim 1, wherein the specified via point is specified for each quadrant in such a manner that no interference occurs in the horizontal articulated robot when moving by point to point operation between the specified via point and the return-to-origin position of the horizontal articulated robot.

3. The horizontal articulated robot according to claim 2, wherein the specified via point is specified for each quadrant in such a manner that no interference occurs in the horizontal articulated robot when moving by point to point operation between a standby/retracted position for any stage that is a target of loading or unloading of the work within the quadrant and the specified via point of the quadrant.

4. The horizontal articulated robot according to claim 1, wherein the specified via point is specified for each quadrant in such a manner that no interference occurs in the horizontal articulated robot when moving by point to point operation between a standby/retracted position for any stage that is a target of loading or unloading of the work within the quadrant and the specified via point of the quadrant.

5. The horizontal articulated robot according to claim 4, wherein the specified via point is specified for each quadrant in such a manner that no interference occurs in the horizontal articulated robot when moving by point to point operation between specified via points of different quadrants.

6. The horizontal articulated robot according to claim 1, wherein the specified via point is prestored in the horizontal articulated robot as being unique to the horizontal articulated robot.

7. A return-to-origin method of a horizontal articulated robot, the horizontal articulated robot comprising at least: a base; a base side link rotatably connected to the base; an arm section side link coupled to the base side link; an arm section freely rotatably connected to the arm section side link; a hand section freely rotatably connected to the arm section to hold a work; a storage for storing teaching data; and a computation unit which controls drive of the base side link, the arm section, and the hand section on a basis of the teaching data, the horizontal articulated robot being used for transferring the work, and the base side link and the arm section side link constituting a link mechanism configured to control in such a manner that a movement locus of a center point of a coupling shaft of the arm section side link and the arm section becomes a predetermined straight line, and, with a center of rotation of the base side link with
respect to the base as an origin, a specified via point is specified for each quadrant of an XY orthogonal coordinate system in which one of two opposite directions parallel to the predetermined straight line is an X-axis positive direction,
the return-to-origin method comprising:
continuously executing recording of coordinates of the horizontal articulated robot during transfer operation and return-to-origin operation,
when a return-to-origin request is input, determining whether or not a current coordinate of the horizontal articulated robot when the return-to-origin request is input is within a predetermined range from a latest recorded coordinate,
when the current coordinate is within the predetermined range, calculating a locus for the return-to-origin operation and moving the horizontal articulated robot in a returning direction to a return-to-origin position,
when the current coordinate is not within the predetermined range, calculating past transfer paths based on past teaching data stored in the storage, and determining whether or not there is any calculated transfer path close to the current coordinate among the past transfer paths, and if there is the calculated transfer path close to the current coordinate, moving the horizontal articulated robot to the calculated transfer path, and then moving the horizontal articulated robot to the return-to-origin position, and
if there is no calculated transfer path close to the current coordinate among the past transfer paths, determining whether or not the hand section is positioned outside of a turn safe area, and when the hand section is positioned outside of the turn safe area, pulling the hand section to an inside of the turn safe area and then moving the horizontal articulated robot to the return-to-origin position through the specified via point specified for each quadrant of an XY orthogonal coordinate system.

8. The return-to-origin method according to claim 7, wherein the specified via point is specified for each quadrant in such a manner that no interference occurs in the horizontal articulated robot when moving by point to point operation between the specified via point and the return-to-origin position of the horizontal articulated robot.

9. The return-to-origin method according to claim 8, wherein the specified via point is specified for each quadrant in such a manner that no interference occurs in the horizontal articulated robot when moving by point to point operation between a standby/retracted position for any stage that is a target of loading or unloading of the work within the quadrant and the specified via point of the quadrant.

10. The return-to-origin method according to claim 9, wherein the specified via point is specified for each quadrant in such a manner that no interference occurs in the horizontal articulated robot when moving by point to point operation between specified via points of different quadrants.

11. The return-to-origin method according to claim 7, wherein the specified via point is specified for each quadrant in such a manner that no interference occurs in the horizontal articulated robot when moving by point to point operation between a standby/retracted position for any stage that is a target of loading or unloading of the work within the quadrant and the specified via point of the quadrant.

12. The return-to-origin method according to claim 11, wherein the specified via point is specified for each quadrant in such a manner that no interference occurs in the horizontal articulated robot when moving by point to point operation between specified via points of different quadrants.

13. The return-to-origin method according to claim 7, wherein the specified via point is prestored in the horizontal articulated robot as being unique to the horizontal articulated robot.

* * * * *